(12) United States Patent
Shinozuka

(10) Patent No.: US 6,560,200 B1
(45) Date of Patent: May 6, 2003

(54) SERIAL BUS EXPERIMENTAL APPARATUS

(75) Inventor: Satoshi Shinozuka, Machida (JP)

(73) Assignees: Kabushiki Kaisha Kenwood, Tokyo (JP); Kenwood TMI Corporation, Kanagawa (JP)

( * ) Notice: Subject to any disclaimer, the term of this patent is extended or adjusted under 35 U.S.C. 154(b) by 0 days.

(21) Appl. No.: 09/265,698

(22) Filed: Mar. 10, 1999

(30) Foreign Application Priority Data

Apr. 16, 1998 (JP) ............................................ 10-124099
Apr. 16, 1998 (JP) ............................................ 10-124100

(51) Int. Cl.[7] .............................................. G01R 31/08
(52) U.S. Cl. ...................................... 370/241; 710/100
(58) Field of Search ................................. 370/241–254, 370/257, 338, 359, 402, 419, 438, 458, 463, 498; 710/100, 101, 126, 129

(56) References Cited

U.S. PATENT DOCUMENTS

| 5,303,344 A | * | 4/1994 | Yokoyama et al. | ......... 709/230 |
| 5,854,840 A | * | 12/1998 | Cannella, Jr. | ............... 380/268 |
| 6,014,381 A | * | 1/2000 | Troxel et al. | .......... 370/395.52 |
| 6,101,543 A | * | 8/2000 | Alden et al. | ................. 709/229 |
| 6,101,567 A | * | 8/2000 | Kim et al. | .................... 710/305 |
| 6,202,103 B1 | * | 3/2001 | Vonbank et al. | ............... 710/15 |
| 6,298,406 B1 | * | 10/2001 | Smyers | ........................ 710/305 |
| 6,427,173 B1 | * | 7/2002 | Boucher et al. | ............ 709/238 |
| 6,457,152 B1 | * | 9/2002 | Paley et al. | ................. 714/738 |

FOREIGN PATENT DOCUMENTS

| JP | 64-086729 | 3/1989 |
| JP | 03-048559 | 3/1991 |
| JP | 06-188952 | 7/1994 |

OTHER PUBLICATIONS

Japanese Office Action, "Notification of Refusal", dated: Jan. 4, 2002.

* cited by examiner

Primary Examiner—David Vincent
(74) Attorney, Agent, or Firm—Robinson Intellectual Property Law Office; Eric J. Robinson

(57) ABSTRACT

The present invention relates to serial bus experimental apparatus which has a simple configuration and allows capture of a series of packets transmitted over a serial bus, and/or allow intentional creation of an intentional pseudo error.

9 Claims, 9 Drawing Sheets

FIG. 2

| BYTE POSITION | BYTE DATA |
|---|---|
| 1 | UPPER BYTE FOR DESTINATION ID |
| 2 | LOWER BYTE FOR DESTINATION ID |
| 5 | UPPER BYTE FOR SOURCE ID |
| 6 | LOWER BYTE FOR SOURCE ID |
|  |  |

FIG. 3

| | | | | | | | | | | ADDRESS |
|---|---|---|---|---|---|---|---|---|---|---|
| 1 | 1 | 1 | 1 | 1 | 1 | 1 | 1 | 1 | 0 | 1 |

TRANSFER SPEED DATA 400 Mbps

| 1 | 1 | 1 | 1 | 1 | 1 | 1 | 1 | 1 | 0 | 5 |
| 0 | 1 | 0 | 1 | 0 | 0 | 0 | 0 | 1 | 0 | 6 |

RECEPTION PACKET PA (200 bytes)

| ← | | PA$_0$ | | | → | | | 1 | 0 | 7 |
| ← | | PA$_1$ | | | → | | | 1 | 0 | 8 |
| ← | | PA$_m$ | | | → | | | 1 | 0 | 206 |
| 0 | 0 | 0 | 0 | 0 | 0 | 0 | 0 | 0 | 0 | 207 |
| 1 | 1 | 1 | 1 | 1 | 1 | 1 | 1 | 1 | 0 | 208 |

TRANSFER SPEED DATA 200 Mbps

| 1 | 1 | 1 | 1 | 1 | 1 | 1 | 1 | 1 | 0 | 212 |
| 0 | 1 | 0 | 0 | x | x | x | x | 1 | 0 | 213 |

RECEPTION PACKET PB (460 bytes)

| ←PB$_0$→ | x | x | x | x | 1 | 0 | 214 |
| ←PB$_1$→ | x | x | x | x | 1 | 0 | 215 |
| ←PB$_y$→ | x | x | x | x | 1 | 0 | 673 |

| 0 | 0 | 0 | 0 | 0 | 0 | 0 | 0 | 0 | 0 | 674 |
| 0 | 0 | 0 | 0 | 0 | 0 | 0 | 0 | 0 | 1 | j-5 |
| 0 | 0 | 0 | 0 | 0 | 0 | 0 | 0 | 0 | 1 | j |

TRANSMISSION PACKET RA (600 bytes)

| ←RA$_0$→ | x | x | x | x | x | x | 1 | 0 | j+1 |
| ←RA$_1$→ | x | x | x | x | x | x | 1 | 0 | j+2 |
| ←RA$_z$→ | x | x | x | x | x | x | 1 | 0 | j+600 |

FIG. 4

| | HEAD ADDRESS | END ADDRESS | TRANSFER SPEED | HEAD TIME |
|---|---|---|---|---|
| RECEPTION PACKET PA | 7 | 206 | 400 | $T_{PA}$ |
| RECEPTION PACKET PB | 214 | 673 | 200 | $T_{PB}$ |
| | | | | |
| TRANSMISSION PACKET RA | j+1 | j+600 | 100 | $T_{RA}$ |

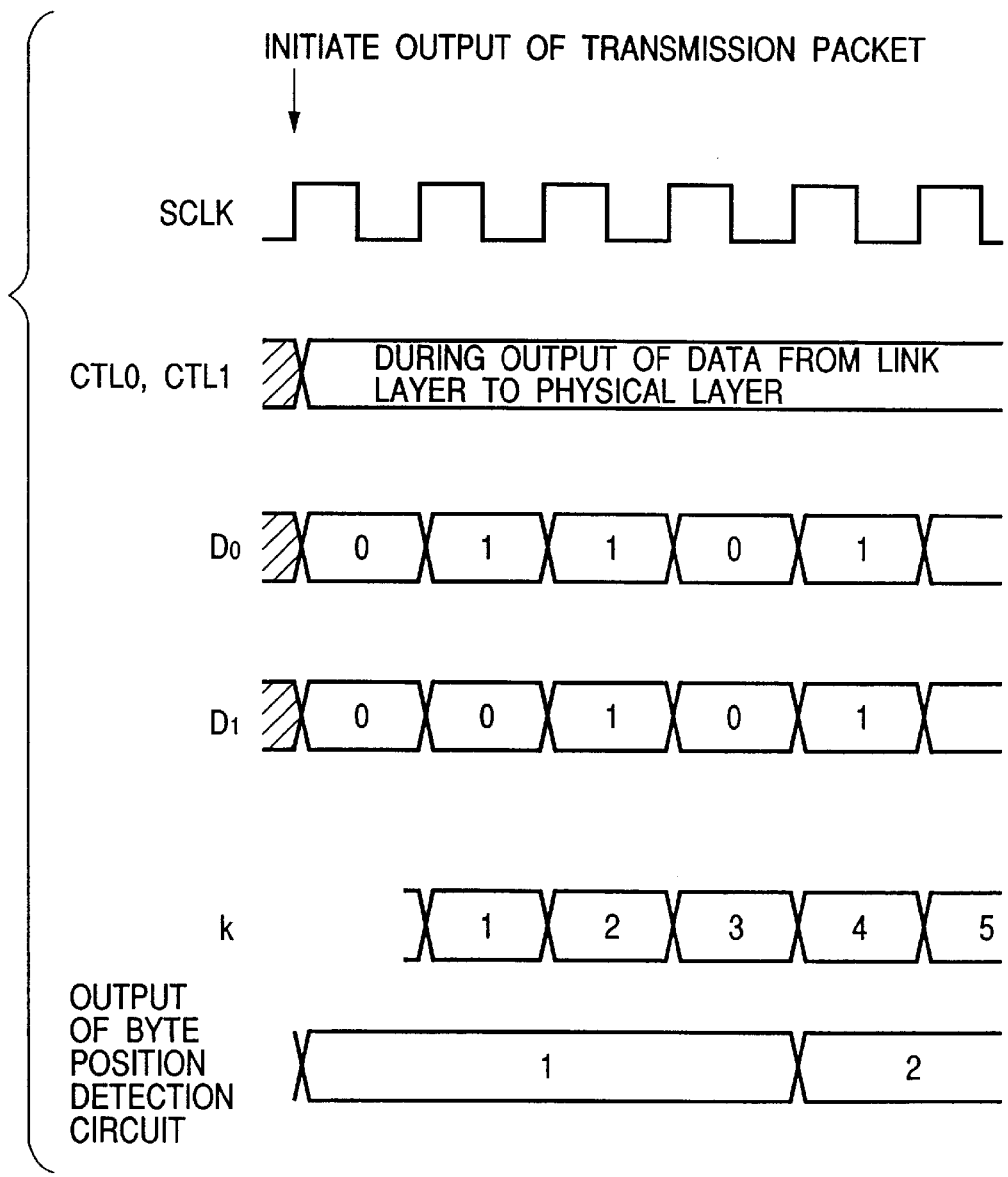

SERIAL BUS EXPERIMENTAL APPARATUS

BACKGROUND OF THE INVENTION

1. Field of the Invention

The present invention relates to serial bus experimental apparatus and more particularly to serial bus experimental apparatus that allows the capturing of a series of massive packets transferred over a serial bus and their processing such as display, and/or that allows the transmission of a packet including an error to a node instrument to be tested.

2. Related Background Art

In recent years, the serial bus named IEEE 1394 (hereinafter, called as "High Performance Serial Bus") has been in practical use. This bus has allowed a personal computer to be connected with printers, digital cameras, external hard disks and the like in a daisy chain or in a tree structure, so that high speed communication between any node instruments has been allowed. The high performance serial bus features that a large number of node instruments can be connected with a small cable and further a massive amount of data, such as dynamic image data, can be easily transferred through the small cable.

As shown in FIG. 6, a high performance serial bus 1 comprises serial bus cables $1_1-1_{n-1}$ connecting a plurality of node instruments $2_1-2_n$ in serial. Each node instrument $2_i$ includes physical layer circuit $4_i$ and link layer circuit $5_i$ which perform protocol control for serial communication in hardware level according to instructions of the high order controller $3_i$. The physical layer circuit $4_i$ is connected to serial bus cables $1_{i-1}$, $1_i$. When the physical layer circuit $4_i$ receives a transmission signal transmitted over the serial bus cable $1_{i-1}$ (or $1_i$) from other node instrument, it outputs the same transmission signal to the serial bus cable $1_i$ (or $1_{i-1}$). At the same time, the physical layer circuit $4_i$ also converts the transmission signal to reception data, and outputs the reception data to the link layer circuit $5_i$. Further, when the physical layer circuit $4_i$ receives transmission data from the link layer circuit $5_i$, it converts the transmission data to a transmission signal and outputs the transmission signal through the serial bus cables $1_{i-1}$ and $1_i$.

The link layer circuit $5_i$ produces a transmission packet destined for other node instrument according to instructions of the high order controller $3_i$ and outputs a transmission data stream composing the transmission packet to the physical layer circuit $4_i$. Specifically, in the case of an isochronous packet for which transfer of 125 micro-second-cycle is guaranteed, upon receipt of header information including data lengths, channel numbers and synchronization codes and data from the controller $3_i$, the link layer circuit $5_i$ produces an isochronous packet (see FIG. 7), conforming to a predetermined format, composed of an integral multiple of four bytes while adding a header CRC and data CRC, obtained by calculation, for error detection/correction and the like. Then, it outputs to the physical layer circuit $4_i$ the transmission data row from the first bit of it in groups of 2 bits (a transfer speed of 100 Mbps), in groups of 4 bits (a transfer speed of 200 Mbps) or in group of 8 bits (a transfer speed of 400 Mbps). In the case of an asynchronous packet that is transferred asynchronously, there are some differences such that a destination ID and source ID are added to the header information as a substitute for the channel number and the like.

Further, when the link layer circuit $5_i$ receives a reception data stream from the physical layer circuit $4_i$, it takes out a reception packet for its own node to capture from the data rows and outputs the packet to the controller $3_i$. The link layer circuit $5_i$ and the physical layer circuit $4_i$ receive and transmit control signals through three control lines CTL0, CTL1 and LReq, and also receives and transmits transmission data or reception data by handshaking using two lines $D_0$ and $D_1$ of eight data lines $D_0-D_7$ (in the case of a transfer speed of 100 Mbps), four lines $D_0-D_3$ (in the case of a transfer speed of 200 Mbps) and eight lines $D_0-D_7$ (above 400 Mbps). In addition, the physical layer circuit $4_i$ performs bus arbitration at the time of transmission and also outputs a clock SCLK synchronized with the control signals and data which are transmitted to the link layer circuit $5_i$ or received from it.

Serial bus experimental apparatus for carrying out performance tests on various node instruments connected to the high performance serial bus has been developed. The serial bus test apparatus, as shown by a reference numeral $2_n$ in FIG. 6, is also connected to the bus as one of node instruments in the same way as the other node instruments. It also includes a controller $3_n$ for a bus test comprising a microprocessor for example, a link layer circuit $5_n$, a physical layer circuit $4_n$, a memory 10, a display 11 and a operational panel 12. For example, when it is desired to test on a node instrument $2_1$ which performs isochronous transfer on a channel number 1, the following have been stored in the memory 10 in advance. That is, various test data to be used in a test on the node instrument $2_1$, the channel number on which the node instrument $2_1$ performs isochronous transfer, the ID of the node instrument $2_1$, the ID of the serial bus experimental apparatus and the like.

When the activation of the node instrument $2_1$ is directed through the operational panel 12, the controller $3_n$ outputs the following to the link layer circuit $5_n$, referring to the memory 10. That is, header information including a transfer speed (here, assumed to be 100 Mbps), the destination ID which is the ID of the node instrument $2_1$, the source ID which is the ID of the serial bus experimental apparatus and the data length of the asynchronous packet, and data including the activation instruction. The link layer circuit $5_n$ produces an asynchronous packet (FIG. 5) conforming to a predetermined format adding a header CRC, data CRC and the like and, at the same time, notices transmission request and the transfer speed to the physical layer circuit $4_n$ through the control line LReq. Then, when the physical layer circuit $4_n$ wins the arbitration of access to the high performance serial bus and provides transmission permission for the link layer circuit $5_n$ through the control lines CTL0, CTL1, the link layer circuit $5_n$ outputs to the physical layer circuit $4_n$ the transmission data in groups of two bits from the first of the asynchronous packet using the data line $D_0$ and $D_1$ in synchronization with the clock SCLK. At this moment, the link layer circuit $5_n$ outputs over the control lines CTL0, CTL1 a control signal to indicate that transmission data is being outputted.

The physical layer circuit $4_n$ receives the transmission data, converts the data to an electrical transmission signal conforming to the standard and outputs the signal to the high performance serial bus.

When the link layer circuit $5_n$ has finished outputting a packet of transmission data and has no packet to transmit, it outputs a control signal to indicate the completion of transmission over the control lines CTL0, CTL1. Receiving the control signal, the physical layer circuit $4_n$ shifts to another processing.

When the node instrument $2_1$ receives the asynchronous packet of the transmission signal transmitted from the serial bus experimental apparatus $2_n$ and transmits back an isochronous packet of a transmission signal at a transfer speed of 100 Mbps in a fixed cycle, the physical layer circuits $4_2$–$4_n$ in all the other node instruments $2_2$–$2_n$ receive the transmission signal and convert it to reception data and output it to the link layer circuits $5_2$–$5_n$. At this moment, the physical layer circuits $4_2$–$4_n$ output over the control lines CTL0, CTL1 control signals to indicate that the reception data is being outputted.

When the control signals to indicate that the reception data is being outputted are on the control lines CTL0, CTL1, the link layer circuits $5_2$–$5_n$ receive the reception data in synchronization with the clock SCLK and reconstitutes the reception packet while performing error detection/correction by using the header CRC and data CRC. And, because it is an isochronous packet, the link layer circuits $5_2$–$5_n$ check if the channel number included in the head is the number of which reception is directed by the high order controllers. If it is the number directed, the isochronous packet is outputted to the high order controllers. If it is not the number directed, this reception packet is ignored. Concerning the serial bus experimental apparatus $2_n$, if it is assumed that the channel number in the head has been directed by the controller $3_n$, in advance, the link layer circuit $5_n$ outputs the reception packet from the node instrument $2_1$ to the controller $3_n$. Then, the controller $3_n$ has the reception packet stored in the memory 10. Each time an isochronous packet is repeatedly received from the node instrument $2_i$, the same processing is repeated.

If display is instructed through the operational panel 12, the controller $3_n$ has the reception packet stored in the memory 10 to be displayed on the display 11 and allows an operator to check it.

BRIEF SUMMARY OF THE INVENTION

Object of the Invention

By the way, in the case of a test on a node instrument connected to a serial bus, it is necessary to check whether the node instrument to be tested correctly transmits and receives packets or not. For this purpose, it is necessary to monitor all packets transmitted over the bus.

Some link layer circuits have the snoop function by which link layer circuits capture all reception packets from the reception data streams inputted from physical layer circuits and output them to the controllers. However, in order that a controller can transmit desired packets destined for other node instruments in parallel with the capture of a large amount of packets, a very high processing speed is required and so the load from the viewpoint of the system configuration is heavy. Further, because the packets captured by the snoop function of a link layer circuit do not include transmission packets, it is impossible to monitor in time sequence all packets transmitted over a serial bus.

Further, when it is desirable to carry out a performance test such that a packet intentionally including a wrong value of data length or a wrong header CRC or a wrong data CRC is transmitted to a node instrument $2_1$ to be tested, it is very difficult to actually perform such a test using link layer circuits $5_n$ on the market in general. Because, link layer circuits $5_n$ on the market produce automatically a correct packet in conformance with the standard. Therefore, it is necessary to make a particular link layer circuit to provide an error packet.

Considering the problems described above of conventional technology, an object of the present invention is to provides a serial bus experimental apparatus which has a simple configuration and allows all packets of a series of packets transmitted over a serial bus to be captured. Another object of the invention is to provide a serial bus experimental apparatus that has a simple configuration and allows forcing an error to occur for carrying out a performance test on a target instrument. Further another object of the invention is to provide a serial bus experimental apparatus comprising both functions above described.

SUMMARY OF THE INVENTION

A serial bus experimental apparatus in accordance with a first aspect of the invention includes a physical layer circuit connected to a serial bus, receiving a transmission signal transmitted over the serial bus from other node instrument, converting the transmission signal to reception data and outputting the data, and converting transmission data to a transmission signal for transmitting the transmission signal over the serial bus, and a link layer circuit connected to the physical layer circuit, according to an instruction from a controller for a test on the serial bus, producing a transmission packet destined for other node instrument, outputting transmission data making up a transmission packet to the physical layer circuit, and further comprises a memory means for allowing the controller for a test on the serial bus to read out the contents of the memory and to perform predetermined processing thereon, and a packet capture means connected to data output sides of the physical layer circuit and the link layer circuit, receiving reception data and transmission data outputted from the physical layer circuit and said link layer circuit, and enforcing a series of packets received and transmitted between the physical layer circuit and the link layer circuit to be stored in the memory means.

The physical layer circuit receives a transmission signal transmitted over the serial bus from other node instruments and converts the transmission signal to transmission data and outputs the data. Further, the link layer circuit, according to an instruction of the controller for a test on the serial bus, produces a transmission packet destined for other node instrument and outputs transmission data making up the transmission packet to the physical layer circuit. The packet capture means receives reception data and transmission data outputted from the physical layer circuit and the link layer circuit, respectively, and enforces a series of packets received and transmitted between the physical layer circuit and the link layer circuit to be stored in the memory means. The controller for a test on serial bus reads out the series of packets stored in the memory means and performs predetermined processing thereon such as a display and printing so as for them to be available for a operator.

Thereby, it is allowed to store into the memory means a series of packets transmitted over the serial bus including a packet transmitted from the serial bus experimental apparatus through a separate path from the path for the controller for a test on serial bus. Therefore, without the need for a controller with capability of high speed processing, the serial bus experimental apparatus allows the transmission of a desired packet for other node instrument, while capturing massive packets transmitted over the serial bus.

The serial bus experimental apparatus in accordance with the first aspect of the invention provides a reference packet set up means for setting a packet of reference for capture and the packet capture means for enforcing packets in a specified time relationship with the reference packet set by the set up means to stored in the memory means.

This allows the capture of packets in any desired time period necessary for analysis, such as a period before and after the transmission of a packet for a node instrument to be tested.

Further, the packet capture means stores the timing information of the packets.

This allows the analysis of timing of packets transmitted over the serial bus together.

The serial bus experimental apparatus in accordance with the first aspect of the invention includes a physical layer circuit connected to a serial bus, receiving a transmission signal transmitted over the serial bus from other node instrument, converting the transmission signal to reception data, and converting transmission data to a transmission signal for transmitting the transmission signal over said serial bus, and a link layer circuit connected to the physical layer circuit, according to an instruction from a controller for a test on the serial bus, producing a transmission packet destined for other node instrument, outputting transmission data making up the transmission packet to the physical layer circuit. The physical layer circuit and the link layer circuit receive and transmit a control signal through a control line and receive and transmit data by handshaking. Further, the apparatus comprises a memory means for allowing the controller for a test on the serial bus to read out the contents of the memory and to perform predetermined processing thereon, and a packet capture means connected to data output sides and to control signal output sides of the physical layer circuit and the link layer circuit, receiving reception data and a control signal outputted from the physical layer circuit and transmission data and a control signal outputted from the link layer circuit, and enforcing a series of packets received and transmitted between the physical layer circuit and the link layer circuit to be stored associated with the control signal data in time relationship stored in said memory means.

The physical layer circuit receives a transmission signal transmitted over a serial bus from other node instrument and converts the transmission signal to transmission data and outputs the data. Further, the link layer circuit, according to the instruction of the controller for a test on the serial bus, produces a transmission packet destined for other node instrument and outputs transmission data making up a transmission packet to physical layer circuit. At this moment, the physical layer circuit and the link layer circuit receive and transmit a control signal through a control line and receive and transmit data by handshaking. The packet capture means receives reception data and a control signal outputted from the physical layer circuit and transmission data and a control signal outputted from the link layer circuit and enforces a series of packets received and transmitted between the physical layer circuit and the link layer circuit to be stored associated with control signal data in time relationship stored in the memory means. The controller for a test on the serial bus reads out the series of packets and control signal data stored in the memory means and performs predetermined processing thereon, such as a display and printing.

Thereby, in addition to a series of packets transmitted over a serial bus including a packet transmitted from the serial bus experimental apparatus, it is allowed to capture the control signal data received and transmitted between the physical layer circuit and the link layer circuit in association with the packet. So, more advanced analysis is allowed.

Further, a reference packet set up means for setting a packet of reference for capture is provided, and the packet capture means stores packets in a specified time relationship with the reference packet set by the set up means together with corresponding control signal data in the memory means.

Thereby, it is possible to capture packets and control signal data in any desired time period required for analysis such as a period before and after the transmission of a packet for a node instrument to be tested.

Further, the packet capture means stores timing information of the packet together stored.

Thereby, it is possible to analyze the timing of the packet transmitted over the serial bus.

A serial bus experimental apparatus in accordance with a second aspect of the invention includes a physical layer circuit connected to a serial bus, receiving a transmission signal transmitted over the serial bus from other node instrument, converting the transmission signal to reception data, and converting transmission data to a transmission signal for outputting the transmission signal over said serial bus, and a link layer circuit connected to said physical layer circuit, according to an instruction from the controller for a test on the serial bus, producing a transmission packet destined for other node instrument, outputting a transmission data stream making up the transmission packet to said physical layer circuit, receiving a reception data stream from said physical layer circuit, taking out therefrom a predetermined packet for outputting the packet to the controller for a test on the serial bus. Further, the apparatus comprises a transmission error creation circuit provided between the physical layer circuit and the link layer circuit and, when the link layer circuit produces a transmission packet destined for other node instrument and outputs the packet, while converting a portion of the transmission data stream making up the transmission packet to different data, inputs the different data to the physical layer circuit.

When the link layer circuit produces and outputs a transmission packet for other node instrument, this serial bus experimental apparatus converts a portion of the packet to different data and inputs the different data to the physical layer circuit, at the same time.

This allows a simple configuration without a particular link layer circuit to transmit a packet including an error and to carry out an operating test when the error packet is received.

In the serial bus experimental apparatus in accordance with the second aspect of the present invention, the transmission error creation circuit includes an error creation position set up means for setting an error creation position in the transmission packet and a position detection means which, for each transmission data of the transmission packet outputted from the link layer circuit, detects each corresponding position within the transmission packet, and a data change means which, when the position detected by the position detection means does not match with the error creation position set by the error creation position set up means, inputs the transmission data outputted from the link layer circuit to the physical layer circuit as it is, and when the position detected by the position detection means matches with the error creation position set by the error creation position set up means, replaces the transmission data outputted from the link layer circuit with different data and inputs the different data to physical layer circuit.

In accordance with this serial bus experimental apparatus, for each transmission data outputted from a transmission packet, each corresponding position within the transmission packet is detected by the position detection means, and, when the position does not match with the error creation position set by the error creation position set up means, the transmission data outputted from the link layer circuit is inputted to the physical layer circuit as it is and, when the position detected by the position detection means matches with the error creation position set by the error creation position set up means, the transmission data outputted from the link layer circuit is replaced with different data and the different data is outputted to the physical layer circuit.

Thereby, it is possible to enforce an error to occur at any desired position by changing an error creation position in the packet set by the error creation position set up means, and so a wide spectrums of tests is allowed.

BRIEF DESCRIPTION OF THE DRAWINGS

FIG. 2 is an illustration of data set to the reference packet set up circuit in FIG. 1;

FIG. 3 is an illustration of the contents of a first region of the memory in FIG. 1;

FIG. 4 is an illustration of the contents of a second region of the memory in FIG. 1;

FIG. 10 is a time chart showing the performance of the transmission error creation circuit in FIG. 9.

DETAILED DESCRIPTION OF THE PREFERRED EMBODIMENTS

Next, a serial bus experimental apparatus of an embodiment of a first aspect of the invention will be explained with reference to FIG. 1.

Figure 1:
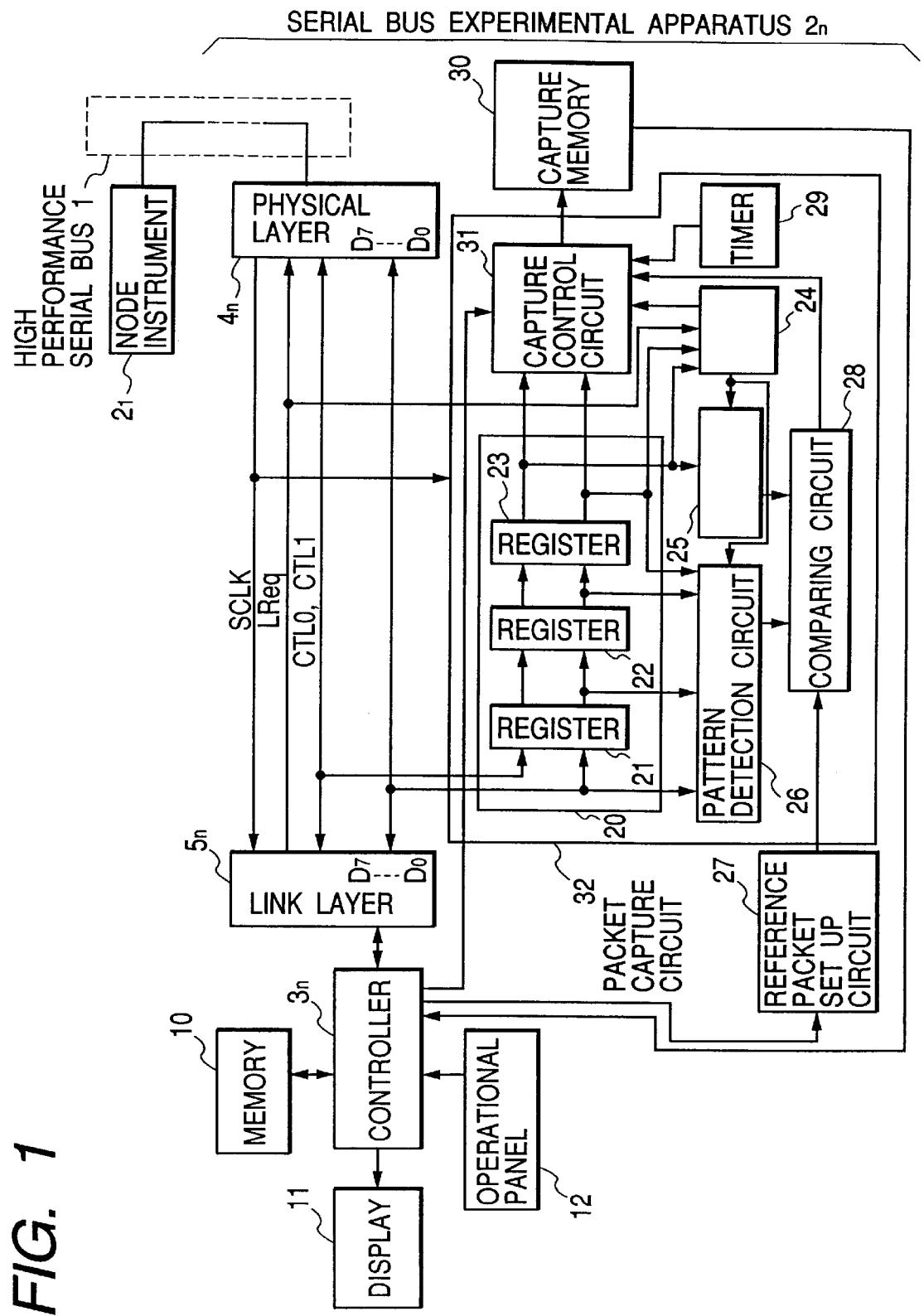
FIG. 1 is a block diagram of an embodiment of a serial bus experimental apparatus according to a first aspect of the present invention.
Figure 6:
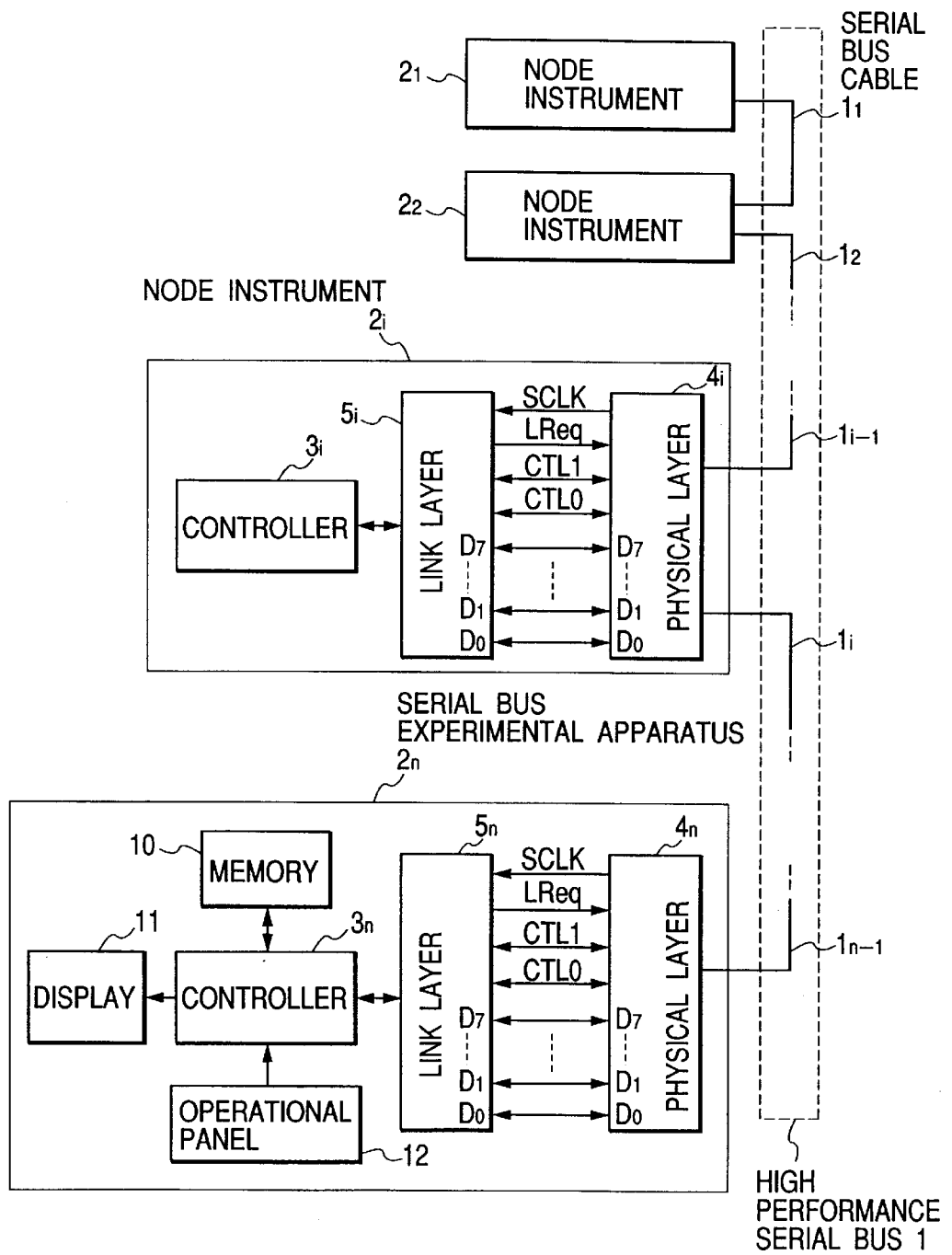
FIG. 6 is an illustration showing the connection method of a high performance serial bus.
Figure 7:
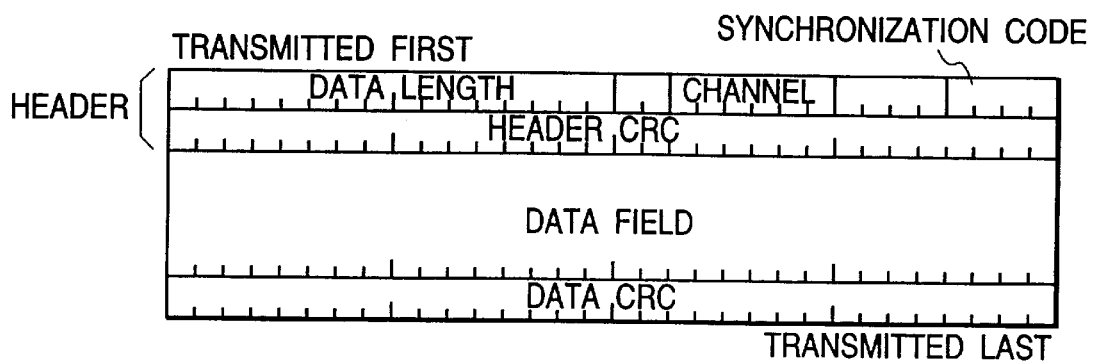
FIG. 7 is an illustration showing a format of an isochronous packet used on a high performance serial bus.

FIG. 1 shows a block diagram of serial bus experimental apparatus of the invention, and the same components as those of FIG. 6 have the same marks.

A reference numeral 20 shows a register circuit, which is made up of three 10-bit parallel registers (hereinafter, abbreviated simply as register) 21, 22, 23 connected in series. On the input side of the register 21, two control lines CTL0, CTL1 are connected to higher order side and eight data lines $D_0-D_7$ are connected to the lower order side. Each time the register 21 receives clocks SCLK, the register 21 captures and outputs CTL0, CTL1 and $D_0-D_7$ at the same time. Each time the register 22 receives the clocks SCLK, the register 22 captures and outputs the CTL0, CTL1 and $D_0-D_1$ outputted from the register 21 at the same time. Each time the register 23 receives the clocks SCLK, the register 23 captures and outputs the CTL0, CTL1 and $D_0-D_1$ outputted from the register 22 at the same time. Therefore, values on the control lines CTL0, CTL1 and data lines $D_0-D_7$ are sequentially transferred from the register 21 to the register 23.

A reference numeral 24 shows a transfer speed identification circuit, which monitors the output of the register 23 and a control line LReq. And, the transfer speed identification circuit identifies a transfer speed from the output of the register 23 at the time of reception of a packet, and further identifies a transfer speed from the output of the control line LReq at the time of transmission of a packet. That is, when a physical layer circuit $4_n$ receives a transmission signal from a high performance serial bus 1 and outputs reception data in synchronization with the clock SCLK, the physical layer circuit $4_n$ changes (CTL0, CTL1) from (0, 0) to (1, 0) first, and, during a certain number of the clocks SCLK, outputs transfer speed codes following the output of $(D_0-D_7)=(11111111)=(FF)_{16}$ and, after that, outputs the reception data from the first data of the reception packet. The transfer speed code is $(D_0-D_7)=(00xxxxxx)$ in the case of 100 Mbps, the transfer speed code is $(D_0-D_7)=(0100xxxx)$ in the case of 200 Mbps, and the transfer speed code is $(D_0-D_7)=(01010000)$ in the case of 400 Mbps (in the link layer circuit $5_n$, x is set to 0 and ignored).

In the case of 100 Mbps, the reception data is outputted in groups of 2 bits using $D_0$ and $D_1$; in the case of 200 Mbps, the reception data is outputted in groups of 4 bits using $D_0-D_3$; and in the case of 400 Mbps, the reception data is outputted in groups of 8 bits using $D_0-D_7$. The transfer speed identification circuit 24 monitors the CTL0, CTL1 outputted from the register 23 and identifies a transfer speed from the first value of $D_0-D_7$ to which the $D_0-D_7$ changes from $(FF)_{16}$, after the (CTL0, CTL1) changed from (0, 0) to (1, 0). Then, the identification circuit 24 immediately outputs the transfer speed identification data to a byte position detection circuit, a pattern detection circuit and a capture control circuit which will be described later.

Further, prior to transmission of a packet, the link layer circuit $5_n$ outputs transfer speed data together with transmission request to a physical layer circuit $4_n$ through a control line LReq. Upon receipt of the transfer speed data through LReq, the transfer speed identification circuit 24 identifies the transfer speed and outputs the transfer speed identification data at the moment of the next change of (CTL0, CTL1) from (0, 0) to (0, 1).

The byte position detection circuit 25, based on the CTL0, CTL1 outputted from the register 23 and the transfer speed identification data inputted from the transfer speed identification circuit 24, detects the byte number among a series of bytes of a transmission packet or reception packet which corresponds to the byte outputted from the $D_1-D_7$ of the register 23. Specifically, when the transmission speed identification data is inputted in the state of the (CTL0, CTL1) which changed from (0, 0) to (1, 0), the first reception data of the reception packet is outputted from the $D_0-D_7$ of the register 23 at the moment of the next clock SCLK.

Therefore, when the transfer speed is 100 Mbps, the count value K, which was initialized to −1 at the change of (CTL0, CTL1) from (0, 0) to (1, 0), is incremented by +1 each time the clock SCLK inputs after the input of the transfer speed identification data. At the same time, the value obtained by dividing the count value K by 4 and adding +1 to the resultant quotient q is outputted as byte position detection data (the byte position detection circuit 25 sets the byte position detection data to 0, in advance).

When the transfer speed is 200 Mbps, the count value K, which was initialized to −1 at the change of (CTL0, CTL1) from (0, 0) to (1, 0), is incremented by +1 each time the clock SCLK inputs after the input of the transfer speed identification data. At the same time, the value obtained by dividing the count value K by 2 and adding +1 to the resultant quotient q is outputted as byte position detection data. When the transfer speed is 400 Mbps, the count value K, which was initialized to −1 at the change of (CTL0, CTL1) from (0, 0) to (1, 0), is incremented by +1 each time the clock SCLK inputs after the transfer speed identification data is inputted. At the same time, the value obtained by adding +1 to the count value K is outputted as a byte position detection data.

On the other hand, when transfer speed identification data is inputted at the change of (CTL0, CTL1) from (0, 0) to (0, 1), the first transmission data of a transmission packet is outputted from the $D_0$–$D_7$ of the register 23 at the change of (CTL0, CTL1) from (0, 1) to (1, 0).

Therefore, if the transfer speed is 100 Mbps, after the count value K is initialized to 0 at the change of (CTL0, CTL1) from (0, 1) to (1, 0), the count value K is incremented by +1 each time the clock SCLK inputs and, at the same time, the value obtained by dividing the count value K by 4 and adding +1 to the resultant quotient q is outputted as byte position detection data. If the transfer speed is 200 Mbps, after the count value K is initialized to 0 at the change of (CTL0, CTL1) from (0, 1) to (1, 0), the count value K is incremented by +1 each time the clock SCLK inputs and, at the same time, the value obtained by dividing the count value K by 2 and adding +1 to the resultant quotient q is outputted as byte position detection data. If the transfer speed is 400 Mbps, after the count value K is initialized to 0 at the change of (CTL0, CTL1) from (0, 1) to (1, 0), the count value K is incremented by +1 each time the clock SCLK inputs and, at the same time, the count value K is outputted as a byte position detection data.

A reference numeral 26 is a pattern detection circuit, which detects an 8bits pattern at the byte position in the transmission packet or the reception packet which was detected by the byte position detection circuit 25. The pattern detection circuit 26 receives the transfer speed identification data indicating 100 Mbps and produces 8 bits pattern data as follows. The pattern detection circuit 26 takes out the output $D_0$ and $D_1$ of the register 23 as $d_0$ and $d_1$, the output $D_0$ and $D_1$ of the register 22 as $d_2$ and $d_3$, the output $D_0$ and $D_1$ of the register 21 as $d_4$ and $d_5$, the output $D_0$ and $D_1$ of the link layer circuit $5_n$ as $d_6$ and $d_7$, respectively. Then, it arranges them in order of ($d_0$, $d_1$, $d_2$, $d_3$, $d_4$, $d_5$, $d_6$, $d_7$) and outputs as parallel output. Thus, 8 bits pattern data is outputted. Here, in the case of 100 Mbps, it is assumed that MSB, 2SB, 3SB, 4SB, 5SB, 6SB, 7SB and LSB of each byte data making up a packet are transferred in groups of 2 bits, that is, ($D_0$, $D_1$)=(MSB, 2SB), ($D_0$, $D_1$)=(3SB, 4SB), ($D_0$, $D_1$)=(5SB, 6SB), ($D_0$, $D_1$)=(7SB, LSB), between the physical layer circuit $4_n$ and the link layer circuit $5_n$.

Further, when the pattern detection circuit 26 receives the transfer speed identification data indicating 200 Mbps, and thereafter it produces 8 bits pattern data as follows. The pattern detection circuit 26 takes out the output $D_0$–$D_3$ of the register 23 as $d_0$–$d_3$, the output $D_0$–$D_3$ of the register 22 as $d_4$–$d_7$, respectively, and arranges them in order of ($d_0$, $d_1$, $d_2$, $d_3$, $d_4$, $d_5$, $d_6$, $d_7$) and then outputs them in parallel. Thus, 8 bits pattern data is outputted. Now, in the case of 200 Mbps, it is assumed that MSB, 2SB, 3SB, 4SB, 5SB, 6SB, 7SB and LSB of each byte data making up a packet are transferred in groups of 4 bits, that is, ($D_0$, $D_1$, $D_2$, $D_3$)=(MSB, 2SB, 3SB, 4SB), ($D_0$, $D_1$, $D_2$, $D_3$)=(5SB, 6SB, 7SB, LSB), between the physical layer circuit $4_n$ and the link layer circuit $5_n$.

Still further, when the pattern detection circuit 26 receives the transfer speed identification data indicating 400 Mbps, after that, it captures the output $D_0$–$D_7$ of the register 23 and outputs in parallel in order of ($d_0$, $d_1$, $d_2$, $d_3$, $d_4$, $d_5$, $d_6$, $d_7$). Here, in the case of 400 Mbps, it is assumed that MSB, 2SB, 3SB, 4SB, 5SB, 6SB, 7SB and LSB of each byte data making up a packet are transferred in a group of ($D_0$, $D_1$, $D_2$, $D_3$, $D_4$, $D_5$, $D_6$, $D_7$)=(MSB, 2SB, 3SB, 4SB, 5SB, 6SB, 7SB, LSB) between the physical layer circuit $4_n$ and the link layer circuit $5_n$.

A reference numeral 27 shows a reference packet set up circuit, which specifies a reference packet used when a series of packets is captured from a high performance serial bus 1 according to the controller $3_n$. Here, one or plural combinations of a byte position in a packet and 1 byte data of the byte position are set up as an example. When plural combinations are set up, they are set up in byte position sequence (see FIG. 2). A reference numeral 28 shows a comparing circuit, in which the combination of a byte position and 1 byte data of the byte position set up by the reference packet set up circuit 27 is compared with the combination detected by the byte position detection circuit 25 and the pattern detection circuit 26. When a match is obtained all in the sequence set up by the reference packet set up circuit 27, a reference packet detection signal is outputted to a capture control circuit.

A reference numeral 29 shows a timer, which is operable to measure time in 10 ns units or in 100 nano-sec units. A reference numeral 30 shows a capture memory, which includes a first region and a second region. The first region stores a series of massive packets transmitted and received between the physical layer circuit $4_n$ and the link layer circuit $5_n$ in association with the control signal data CTL0, CTL1 in time sequence. The second region stores the memory position in the first region, transfer speed and start time on a packet-by-packet basis.

A reference numeral 31 shows a capture control circuit. Referring to the control signal data CTL0, CTL1 outputted from the register 23 in the register circuit 20 and the transfer speed identified by the transfer speed identification circuit 24, the capture control circuit 31 stores data of a series of packets in a specified time relationship with a reference packet among the reception and transmission packets outputted from the register 23 in correspondence with the control data CTL0, CTL1 into the first region of the capture memory 30. And, it stores the memory position, transfer speed and start time into the second region on a packet-by-packet basis.

A packet capture circuit 32 comprises the register circuit 20, transfer speed identification circuit 24, byte position detection circuit 25, pattern detection circuit 26, comparing circuit 28, timer 29 and capture control circuit 31.

According to the instruction for transmitting or receiving through the operational panel 12, the controller $3_n$ instructs the link layer circuit $5_n$ to transmit a packet for a desired node instrument or to receive a packet from a desired node instrument. Further, according to the instruction through the operational panel 12, the controller $3_n$ allows the display of a reception packet stored in the memory 10 on the display device 11 or to allow the display of packet and control signal data stored in the capture memory 30 on the display device 11. Still further, the controller $3_n$ sets a reference packet to the reference packet set up circuit 27 in the packet capture circuit 32, and instructs the capture control circuit 31 to start or stop capturing.

The other components of the serial bus experimental apparatus $2_n$ are arranged as shown in FIG. 6.

Figure 5:
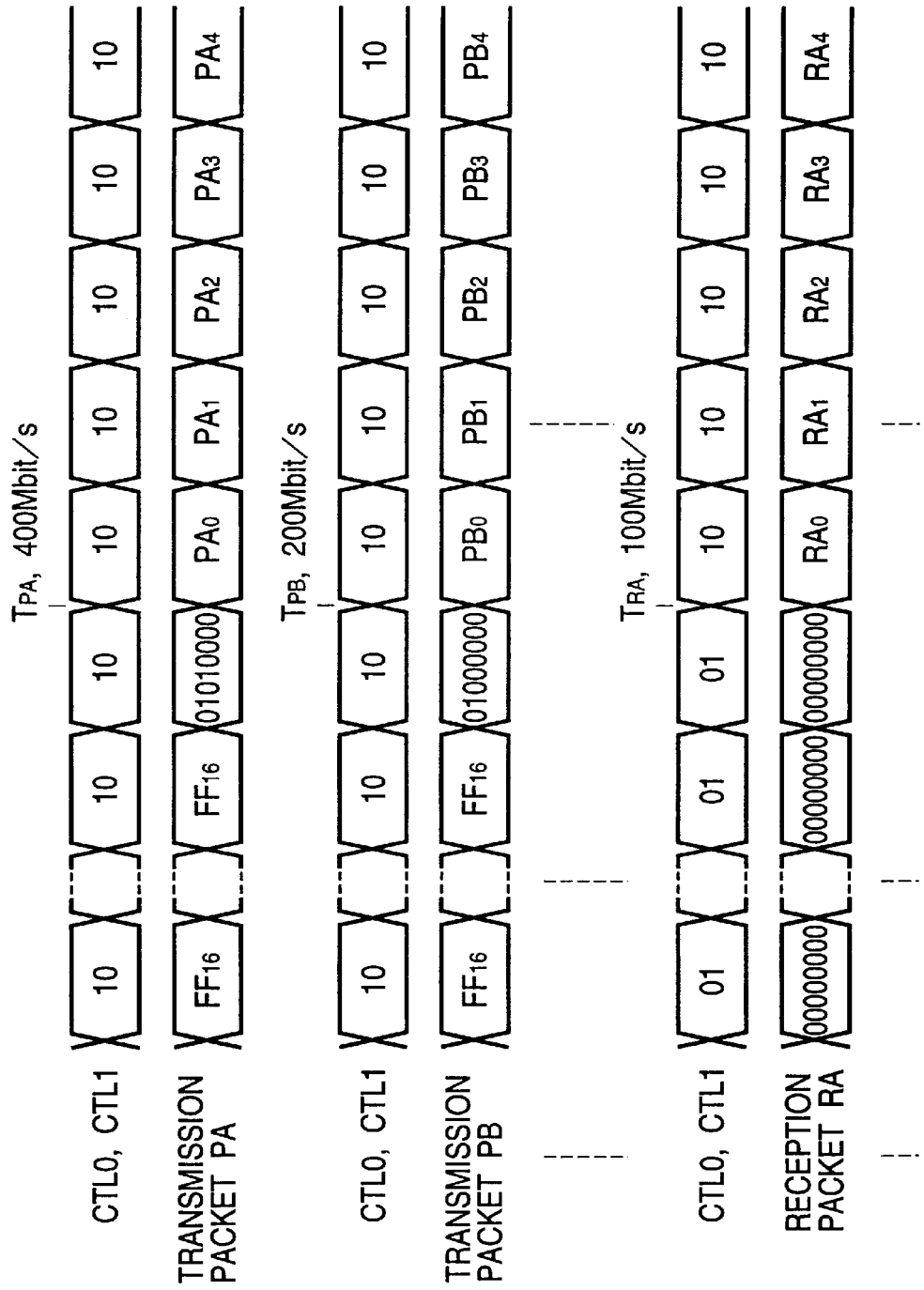
FIG. 5 is an illustration of an example of display of the display device in FIG. 1.

The following will simply describe the operation of the embodiment described above with reference to FIG. 3–FIG. 5. FIG. 3 is an illustration of the memory contents of the first region in the capture memory 30. FIG. 4 is an illustration of the memory contents of the second region in the capture memory 30. FIG. 5 is an illustration of an example of display on the display device 11.

Here, in this example, it is assumed that a performance test on a node instrument $2_1$ will be carried out. Further, this case is concerned with the monitoring of all the transmission packets over the high performance serial bus 1 in a fixed time period before and after the transmission of an activation command for the node instrument $2_1$. It is assumed that various test data used in the test on the node instrument $2_1$, the channel number over which the node instrument $2_1$ performs isochronous transfer, the ID of the node instrument $2_1$, the ID of the serial bus experimental apparatus $2_5$ and the like have been stored in the memory 10, in advance. The link layer circuit $5_n$ is assumed not to have snoop function (the function not to choose).

(1) Reception Operation

When node instruments such as $2_1$, $2_2$ etc. are outputting transmission signals of packets over the high performance serial bus 1, the physical layer circuit $4_n$ of the serial bus experimental apparatus $2_n$ receives the signals and outputs reception data in synchronization with the clock SCLK. At this moment, first, the physical layer circuit $4_n$ changes (CTL0, CTL1) from (0, 0) to (1, 0). When the physical layer circuit $4_n$ receives the packet and changes the control lines CTL0, CTL1 from (0, 0) to (1, 0), the link layer circuit $5_n$ receives the reception data in synchronization with the clock SCLK. Then, the link layer circuit $5_n$ reconstitutes the reception packet while performing error detection/correction on the header and data by using a header CRC and data CRC.

And, if it is an isochronous packet, the link layer circuit $5_n$ checks whether the channel number included in the header is the number of which reception has been directed by the high order controller $3_n$. When the number is one directed, the link layer circuit $5_n$ outputs the reception packet to the controller $3_n$, and, when the number is not one directed, the link layer circuit $5_n$ ignores this reception packet. Further, if it is an asynchronous packet, the link layer circuit $5_n$ checks whether the destination ID matches with the ID of its own node or not. When a match is obtained, the link layer circuit $5_n$ outputs the packet to the controller $3_n$, and, when a match is not obtained, ignores this reception packet.

The controller $3_n$ receives the reception packet from the link layer circuit $5_n$ and has the packet stored in the memory 10. Then, according to an instruction through the operational panel 12, the controller $3_n$ performs necessary processing on the reception packet, such as a display on the display device 11.

The link layer circuit $5_n$ does not have the snoop function and so can not capture all reception packets based on the reception data input from the physical layer circuit $4_n$. This embodiment is provided with the packet capture circuit 32 and the capture memory 30 and so allows the capture of a series of massive packets transmitted over the high performance serial bus 1.

That is, at the moment when the physical layer circuit $4_n$ receives a transmission signal from the high performance serial bus 1, and outputs the reception data in synchronization with the clock SCLK, the physical layer circuit $4_n$ changes (CTL0, CTL1) from (0, 0) to (1, 0), first. The capture control circuit 31 monitors the CTL0, CTL1 of the register 23 and, at the moment when the (CTL0, CTL1) has changed from (0, 0) to (0, 1), starts writing 10-bit data of the combination of the ($D_0$–$D_7$) of the register 23 and the (CTL0, CTL1) into the first region of the memory 30 from the address 0 in synchronization with the clock SCLK, in turn (see FIG. 3).

When a speed code is outputted from the $D_0$–$D_7$ of the register 23, the transfer speed identification circuit 24 identifies the transfer speed and outputs the transfer speed identification data to the byte position detection circuit 25, pattern detection circuit 26 and capture control circuit 31. When the capture control circuit 31 receives the transfer speed identification data, as the $D_0$–$D_7$ next outputted from the register 23 is the first reception data of the reception packet, the capture control circuit 31 writes the address (7) when it wrote at that timing the reception data in the first region into the second region as the first address of the reception packet PA, together with the transfer speed designated by the transfer speed identification data and the time data $T_{PA}$ measured by the timer 29.

When the transfer speed is 400 Mbps, 1 byte units of reception data $PA_0$, $PA_1$, . . . are outputted from the $D_0$–$D_7$ of the register 23 and stored together with the CTL0, CTL1 into the first region. When the writing of the last 1 byte data $PA_m$ of the reception packet PA is completed, the (CTL0, CTL1) outputted from the register 23 becomes (0, 0) and ($D_0$–$D_7$) becomes (0, 0, 0, 0, 0, 0, 0, 0). Therefore, after the capture control circuit 31 writes these data into the first region, as the $D_0$–$D_7$ corresponding to last (0, 1) is the last reception data of the reception packet PA, the capture control circuit 31 writes the address (206) when it wrote at the timing of the (0 1) the reception data in the first region into the second region as the termination address.

After that, when a next packet PB is received, at the instant when the (CTL0, CTL1) outputted from the register 23 has changed from (0, 0) to (1, 0), the capture control circuit 31 starts writing 10-bit data of the combination of the ($D_0$–$D_7$) from the register 23 and (CTL0, CTL1) into the first region of memory 30 from an address 208 in synchronization with the clock SCLK, in turn (see the contents below the address 208 in FIG. 3).

When the speed code is outputted from the $D_0$–$D_7$ of the register 23, the transfer speed identification circuit 24 identifies the transfer speed and outputs the transfer speed identification data to the byte position detection circuit 25, pattern detection circuit 26 and capture control circuit 31. When the capture control circuit 31 receives the transfer speed identification data, as the $D_0$–$D_7$ next outputted from the register 23 is the first reception data of the reception packet PB, the capture control circuit 31 writes the address (214) when it wrote at that timing the reception data in the first region into the second region as the first address of the reception packet PB, together with the transfer speed designated by the transfer speed identification data and the time data $T_{PB}$ measured by the timer 29.

When the transfer speed is 200 Mbps, 4-bit units of reception data $PB_0$, $PB_1$, . . . , are outputted from the $D_0$–$D_3$ of the register 23 and stored into the first region together with the CTL0, CTL1 (further, although x is 0 in FIG. 3, it is ignored as packet data).

When the writing of the last 4 bits data $PB_y$ of the reception packet PB is completed, the (CTL0, CTL1) outputted from the register 23 becomes (0, 0) and ($D_0$–$D_7$) becomes (00000000). Therefore, after the capture control circuit 31 writes these data into the first region, as the $D_0$–$D_3$ corresponding to the last (0, 1) is the last reception data, the capture control circuit 31 writes the address (673) when it wrote the reception data at the timing of the (0 1) the reception data into the first region into the second region as the termination address of the reception packet PB (see FIG. 4).

After that, each time a new packet is received, the same operation will be repeated. Further, when the capture control circuit 31 has written data up to the last address of the first region, it returns to the first address to write in data.

(2) Transmission Operation

When an instruction directs the activation of the node instrument $2_1$ through the operational panel 12, the controller $3_n$ outputs the following to the link layer circuit $5_n$ with reference to the memory 10. That is, the data including the transfer speed (in this case, assume 100 Mbps), destination ID of the ID of the node instrument $2_1$, source ID of the ID of the serial bus experimental apparatus, data length of the asynchronous packet, header information including synchronization code and activation command. Further, in order to set this asynchronous packet as a reference packet, first, the controller $3_n$ pairs the contents of the first byte (upper byte) and second byte (lower byte) of the destination ID with the respective byte positions (namely, 1 and 2) in the packet and sets the pairs to the reference packet set up circuit 27. Next, the controller $3_n$ pairs the contents of the first byte (upper byte) and second byte (lower byte) of the source ID with the respective byte positions (namely, 5 and 6) in the packet and set the pairs to the reference packet set up circuit 27 (see FIG. 2). Then, the controller $3_n$ instructs the capture control circuit 31 to capture the packets in a fixed time period, centering on the reference packet, before and after the reference packet.

Figure 8:
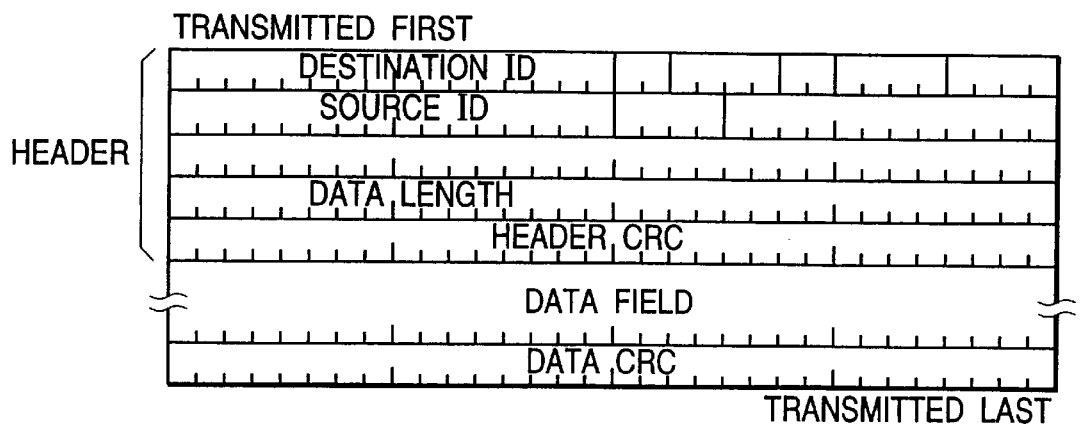
FIG. 8 is an illustration showing a format of an asynchronous packet used on a high performance serial bus.

When the controller $3_n$ instructs the link layer circuit $5_n$ for transmitting, the link layer circuit $5_n$ produces an asynchronous packet conforming to a predetermined format (see FIG. 8) adding a header CRC and data CRC. At the same time, the link layer circuit $5_n$ notices transmission request and the transfer speed to the physical layer circuit $4_n$ through the control line LReq. When the physical layer circuit $4_n$ wins the arbitration of access to the high performance serial bus and provides transfer permission for the link layer circuit $5_n$ through the control line CTL0, CTL1, the link layer circuit $5_n$ sets (CTL0, CTL1) to (0, 1) and ($D_0$–$D_7$) to $(0\ 0)_{16}$ during a certain number of clocks and, thereafter, outputs to the physical layer circuit $4_n$ the transmission data in groups of 2 bits from the first of the asynchronous packet in synchronization with the clock SCLK through the data lines $D_0$ and $D_1$ (at this time, the link layer circuit $5_n$ sets (CTL0, CTL1)=(1, 0) to indicate that transmission data is being outputted).

Upon receipt of transmission data, the physical layer circuit $4_n$ converts the transmission data to an electrical transmission signal conforming to the standard and outputs the signal to the high performance serial bus 1.

When the link layer circuit $5_n$ completes the output of the transmission data and has no other packet to transmit, the link layer circuit $5_n$ changes the (CTL0, CTL1) from (1, 0) to (0, 0) to indicate the completion of transmission. Receiving this signal, the physical layer circuit $4_n$ shifts to other processing.

On the other hand, concerning the packet capture circuit 32, when the link layer circuit $5_n$ outputs the transmission speed together with transmission request through the control line LReq, the transmission speed identification circuit 24 identifies the transmission speed. Then, at the instant when the (CTL0, CTL1) outputted from the register 23 has changed (0, 0) to (0, 1), the transmission speed identification circuit 24 outputs the transmission identification data indicating the 100 Mbps to the byte position detection circuit 25, pattern detection circuit 26 and capture control circuit 31.

The capture control circuit 31 starts writing 10-bit data of the combination of the ($D_0$–$D_7$) and (CTL0, CTL1) into the first region of the capture memory 30 in synchronization with the clock SCLK at the instant when the output (CTL0, CTL1) of the register 23 has changed from (0, 0) to (1, 0) (refer to the contents below an address (j−5) in FIG. 3).

As the $D_0$–$D_7$ outputted from the register at the instant when the output (CTL0, CTL1) of the register 23 has changed from (0, 1) to (1, 0) is the first transmission data of the transmission packet RA, the capture control circuit 31 writes the address (j) when it wrote at the timing of the (1 0) the data in the first region into the second region as the first address of the transmission packet RA, together with the transmission speed and the time data TPB measured by the timer 29.

If the transmission speed is 100 Mbps, 2-bit units of the transmission data $RA_0$, $RA_1$, ..., are outputted from the $D_0$ and $D_1$ of the register 23 and, at the same time, stored in the first region together with the CTL0, CTL1. When the capture control circuit 31 has finished writing the last one byte data $RA_z$ of the transmission packet RA, the (CTL0, CTL1) outputted from the register 23 changes to (0, 0) and ($D_0$–$D_7$) changes to (00000000). After writing these data into the first region, as the $D_0$ and $D_1$ corresponding to the last (1 0) are the last data of the transmission packet RA, the capture control circuit 31 writes the address (j+600) when it wrote at the timing of the last (1 0) the data in the first region into the second region as the termination address of the transmission packet RA.

By the way, on the transmission of this packet, when the byte position detection circuit 25 receives the transfer speed identification data indicating 100 Mbps at the instant when the output (CTL0, CTL1) has changed from (0, 0) to (0,1), the byte position detection circuit 25 initializes the count value K to zero at the instant when the output (CTL0, CTL1) has changed from (0, 1) to (1,0), and increments the count value K by +1 each time the clock SCLK inputs. Further, it outputs as byte position detection data the value obtained by dividing the count value K by 4 and adding +1 to the resultant quatient q (the byte position detection circuit 25, in advance, initialized byte position detection data to zero).

Further, after receiving the transfer speed identification data indicating 100 Mbps, the pattern detection circuit 25 takes out the output $D_0$ and $D_1$ of the register 23 as $d_0$ and $d_1$, the output $D_0$ and $D_1$ of the register 22 as $d_2$ and $d_3$, the output $D_0$ and $D_1$ of the register 21 as $d_4$ and $d_5$, the output $D_0$ and $D_1$ of the link layer circuit $5_n$ as $d_6$ and $d_7$, respectively, and arranges and outputs them in parallel in order of ($d_0$, $d_1$, $d_2$, $d_3$, $d_4$, $d_5$, $d_6$, $d_7$). Thus, 8 bits pattern data is outputted.

Each time the byte position detected by the byte position detection circuit 25 changes from 0 to 1, from 1 to 2, from 2 to 3, ..., the comparing circuit 28 immediately checks whether it matches with each byte position which has been set to the reference packet set up circuit 27. When a match is obtained, the comparing circuit 28 checks whether the 8 bits pattern being detected at that instant by the pattern detection circuit 26 matches with the byte data which has been set to the reference packet set up circuit 27 in correspondence to the byte position in question.

The detection pattern in the detection byte position of 1 matches with the upper byte data of the destination ID provided corresponding to the first byte position 1 which has been set to the reference packet set up circuit 27; then, the detection pattern in the detection byte position of 2 matches with the lower byte data of the destination ID provided corresponding to the second byte position 2 which has been set to the reference packet set up circuit 27; then, the detection pattern in the detection byte position of 5 matches with the upper byte data of the source ID provided corresponding to the third byte position 5 which has been to the reference packet set up circuit 27; finally, the detection pattern in the detection byte position of 6 matches with the lower byte data of the source ID provided corresponding to the fourth byte position 6 which has been set to the reference packet set up circuit 27; thus, when these matches are obtained, the comparing circuit 28 outputs the reference packet detection signal to the capture control circuit 31.

Upon reception of the reference packet detection signal, as the controller $3_n$ has instructed the capture control circuit 31 to capture packets in a fixed time period centering on the reference packet in advance, after that, the capture control circuit 31 writes the 10-bit data consisting of ($D_0$–$D_7$) and (CTL0, CTL1) into the first region by the half amount of the whole addresses of the first region. Thereby, a series of packets in the same time periods before and after the present transmission packet RA, centering on the packet RA, can be captured.

When all the transmission data of the transmission packet RA has been written into the first region and the output (CTL0, CTL1) of the register 23 changes to (0, 0), the capture control circuit 31 temporally suspends the writing in the first region. After that, when a new packet transmitted over the high performance serial bus 1 is received, it writes it into the capture memory 30 in the same manner as described above.

When the node instrument $2_1$ receives the transmission signal of an asynchronous packet transmitted from the serial bus experimental apparatus $2_n$ and returns back a transmission signal of an isochronous packet at the transfer speed of 100 Mbps in a fixed cycle, the physical layer circuit $4_n$ receives and converts the transmission signal to reception data, and outputs the reception data to the link layer circuit $5_n$. The link layer circuit $5_n$ receives the reception data in synchronization with the clock SCLK, and reconstitutes the reception packet performing error detection/correction on the header and data by using the header CRC and data CRC. And, as the reception packet is an isochronous packet, the link layer circuit $5_n$ checks whether the channel number included in the header is the number whose reception is directed by the high order controller $3_n$. If the number is one directed, the link layer circuit $5_n$ outputs the packet to the controller $3_n$. The controller $3_n$ enforces the packet to be stored in the memory 10.

On the other hand, the reception packet from the node instrument $2_1$ is associated with the control signal data of CTL0, CTL1 and written into the first region of the capture memory 30 in time sequence by the capture control circuit 32, in the same manner as described above. Further, the first address and termination address when the reception packet wrote, transfer speed and time data are written into the second region of the capture memory 30.

Each time an isochronous packet from the node instrument $2_1$ is received repeatedly, the same processing is repeated.

Then, after a reference packet detection signal is inputted, when the amount of 10-bit data of ($D_0$–$D_1$) and (CTL0, CTL1) corresponding to the half amount of the whole addresses of the first region have been written, the writing of the capture memory 30 is completed. As a of each packet and the operation of scrolling down allows display of packets at a later time).

The capture memory 30 includes the packets outputted from all nodes transmitted over the high performance serial bus 1 and these packets are associated with the control signal data CTL0, CTL1, so that any operation at any timing of the node instrument $2_1$ to be tested can be analyzed in detail.

Further, it is possible to set a reference packet targeting a reception packet. Also, when the controller $3_n$ instructs the capture which starts at a reference packet, the capture control circuit 31 can write up to the last address of the first region, then return to the first address, and then write again. Then, the capture will be finished at an address of a few tens clocks before the first address of the reference packet. When the controller $3_n$ instructs the capture which ends at a reference packet, the capture will be finished at the point of writing up to the last of the reference packet.

In accordance with the embodiment described above, a series of packets transmitted over the high performance serial bus 1, including the packets transmitted from the serial bus experimental apparatus $2_n$, is captured into the capture memory 30 through a separate path different from the path to the controller $3_n$ for the serial bus result, the capture memory 30 has stored the information of a series of all packets transmitted over the high performance serial bus 1 in a specified time period, including transmission packets, centering on the transmission packet RA provided as an activation instruction to the node instrument $2_1$, before and after the packet RA. Therefore, an accurate inspection on the operating characteristics of the node instrument $2_1$ is allowed at a later time.

When an operator instructs display of a transmission packet stored in the memory 10 through the operational panel 12, the controller $3_n$ enforces the packet to be read out from the memory 10 and to be displayed on the display 11. However, as the memory 10 does not store all the reception packets and further does not have the transmission packets, allowable analysis items are limited.

On the other hand, when an operator instructs display of a packet captured in the capture memory 30 through the operational panel 12, the controller $3_n$ enforces the packet to be read out from the capture memory 30 and to be displayed on the display 11, for example, as shown in FIG. 5 (in FIG. 5, the contents of the leading portions of a series of packets transmitted over the high performance serial bus 1 are shown in time sequence. The operation of scrolling to the right allows display of the later points experimental apparatus. At a later time, it is allowed to read out the captured packets from the capture memory 30 and to perform desired processing thereon, such as a display. Therefore, without the need for high-speed processing of the controller $3_n$, the serial bus experimental apparatus $2_n$ can transmit desired packets for destined for other node instruments in parallel, while capturing massive packets transmitted over the high performance serial bus 1.

Further, the embodiment provides the reference packet set up circuit 27 for setting a packet of reference for capture. The packet capture circuit 32 operates to store in the capture memory 30, the packets having a specified time relationship with the reference packet set by the reference packet set up circuit 27. Therefore, it is possible to capture packets in any desired time period necessary for analysis, such as a period before and after the transmission of a packet destined for a node instrument to be tested.

Further, as the packet capture circuit 32 allows the storing together with timing information (that is, data of the timer) of a packet, it is also possible to analyze the timing of the packet transmitted over the high performance serial bus 1.

Still further, in addition to a series of packets transmitted over the high performance serial bus 1, including the packet transmitted from the serial bus experimental apparatus $2_n$, the control signal data (for example, LReq, CTL0, CTL1) transmitted and received between the physical layer circuit $4_n$ and the link layer circuit $5_n$ can be captured in association with the packets. Thereby, more advanced analysis, such as whether the transfer speed of a reception packet is correctly detected, is possible.

Next, referring to FIG. 9, a serial bus experimental apparatus of an embodiment in accordance with a second aspect of the invention will be explained.

Figure 9:
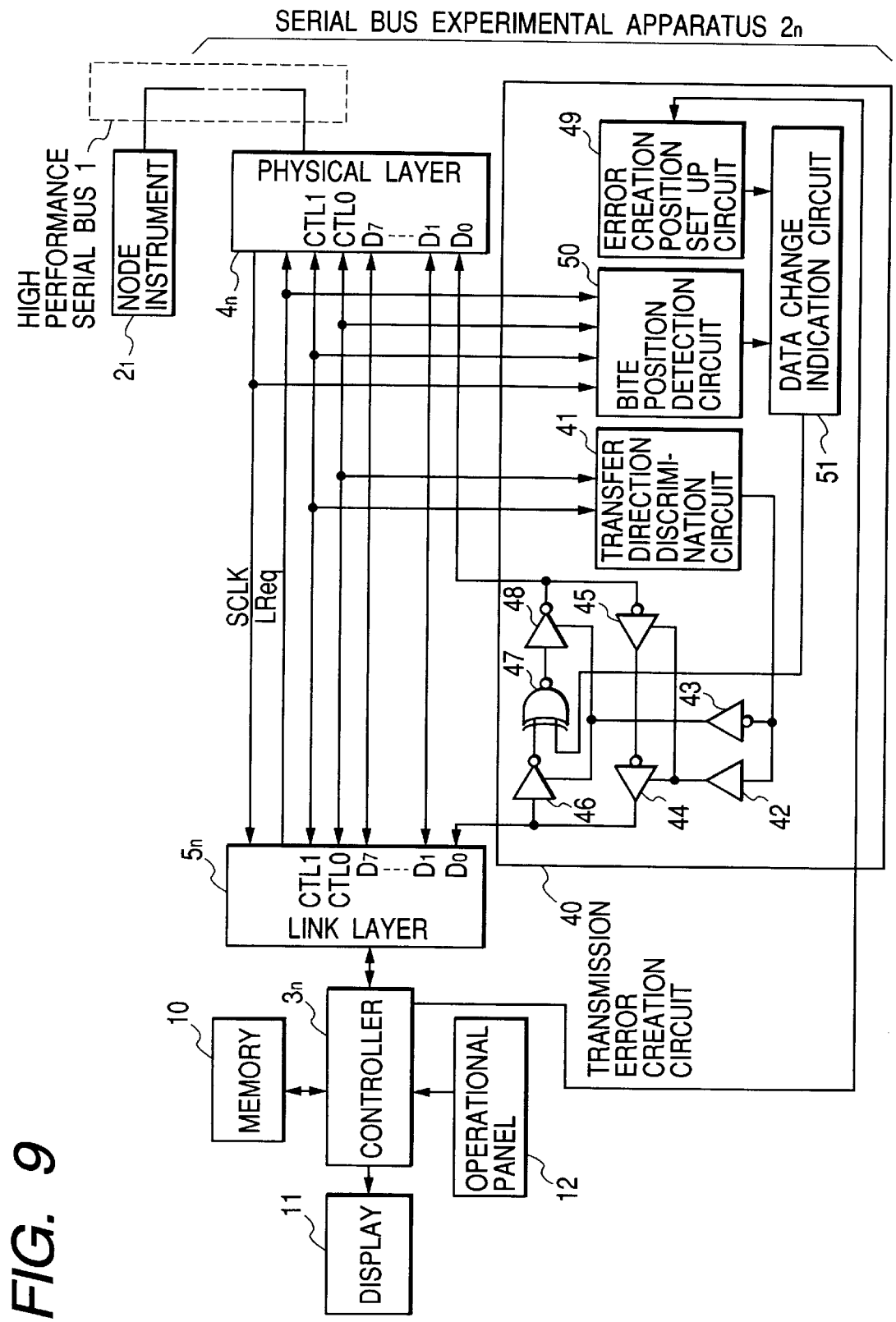
FIG. 9 is a block diagram of an embodiment of a serial bus experimental apparatus in accordance with to a second aspect of the invention.

FIG. 9 is a block diagram of a serial bus experimental apparatus of the invention, the same marks are attached to the same components as those of FIG. 6.

A reference numeral 40 shows a transmission error creation circuit. The link layer circuit $5_n$ produces a transmission packet for other node instrument and outputs a transmission data stream making up the transmission packet. Then, the transmission error creation circuit 40 replaces a portion of the data with other data and inputs the replaced data to the physical layer circuit to produce a transmission packet including an error.

A reference numeral 41 in the transmission error creation circuit 40 shows a transfer direction discrimination circuit. The transfer direction discrimination circuit 41 identifies if the data lines $D_0$–$D_7$ are used for the data transmission from the link layer circuit $5_n$ to the physical layer circuit $4_n$ based on the control signals outputted to the control lines CTL0 and CTL1. When the data lines $D_0$–$D_7$ are used for the data transmission from the link layer circuit $5_n$ to the physical layer circuit $4_n$, the discrimination circuit 41 outputs an L level, and when not used, outputs an H level. Reference numerals 42 and 43 show buffer circuits connected to the output side of the transmission direction discrimination circuit 41. The buffer 42 outputs an L level and an H level when the input is an L level and an H level, respectively. The buffer 43 outputs an H level and an L level when the input is an L level and an H level, respectively.

Reference numerals 44 and 45 show buffer circuits connected in series between the $D_0$ terminal of the physical layer circuit $4_n$ and the $D_0$ terminal of the link layer circuit $5_n$. While the output from the buffer circuit 42 is an H level, the buffer circuits 44 and 45 are active and the output from the $D_0$ terminal of the physical layer circuit $4_n$ is inputted to the $D_0$ terminal of the link layer circuit $5_n$ as it is. The buffer circuit 46, EX-NOR circuit 47 and buffer circuit 48 are connected in series and then connected in parallel with the buffers 44 and 45 connected in series. While the output of the buffer circuit 43 is an H level, the buffer circuits 46 and 48 are active, and further, while an input to the EX-NOR circuit 47 from a data change indication circuit to be described below is H, the output from the $D_0$ terminal of the link layer circuit $5_n$ is inputted to the $D_0$ terminal of physical layer circuit $4_n$ as it is, but the output from the $D_0$ terminal of the link layer circuit $5_n$ is inverted to input to physical layer circuit $4_n$ while the input from the data change indication circuit is L.

A reference numeral 49 is an error creation position set up circuit. According to the instruction from the controller $3_n$, the error creation position set up circuit 49 sets a position for an error to be created in a transmission packet with a byte position from the first byte of the packet. The setting of the error creation position can be performed at one or more positions, and also, by setting no error, a packet including no error can be transmitted.

A reference numeral 50 shows a byte position detection circuit. When the link layer circuit $5_n$ outputs a transmission data stream making up a transmission packet, the byte position detection circuit 50 detects a byte position of the transmission data from the first byte of the packet. Specifically, when the control signals outputted to the control lines CTL0, CTL1 indicates that the link layer circuit $5_n$ starts outputting the transmission data of one certain packet toward the physical layer circuit $4_n$, the byte position detection circuit 50 outputs a byte position 1 as a detection byte position. Thereafter, the number of input count of the clock SCLK is counted and the count value is represented as k. When the transfer speed indicated by LReq is 100 Mbps, each time the count value k becomes a multiple of 4, the byte position is incremented by +1 and then outputted. In the case of the transfer speed of 200 Mbps, each time k is a multiple of 2, the byte position is incremented by +1 and then outputted. In the case of the transfer speed above 400 Mbps, each time k increases by +1, the byte position is incremented by +1 and then outputted (see FIG. 10).

A reference numeral 51 shows a data change indication circuit. When the byte position detected by the byte position detection circuit 50 matches with the position set by the error creation position set up circuit 49, the data change indication circuit 51 outputs an L level to the EX-NOR circuit 47. Thereby, $D_0$ among the transmission data being outputted from the link layer circuit $5_n$ is inverted and inputted to physical layer circuit $4_n$. Otherwise, the data change indication circuit 51 outputs an H level to the EX-NOR circuit 47. Thereby, $D_0$ among the transmission data being outputted from the link layer circuit $5_n$ is not inverted and inputted to physical layer circuit $4_n$.

The other components for the serial bus experimental apparatus $2_n$ are the same as those shown in FIG. 6.

Next, the embodiment described above will be explained in detail with reference to FIG. 10. Here, it is assumed to carry out a performance test on the node instrument $2_1$ when the node instrument $2_1$ receives a packet including an error. For convenience of explanation, the transmission speed of a packet from the serial bus experimental apparatus $2_n$ is assumed to be 100 Mbps. Further, it is assumed that errors are created at 13th and 14th bytes which include the values of a data length in an asynchronous packet.

When activation of the node instrument $2_1$ is instructed through the operational panel 12, the controller $3_n$ outputs the following to the link layer circuit $5_n$ referring to the memory 10. That is, header information including the transmission speed (in this case, 100 Mbps), the destination ID that is the node ID of the node instrument 21, the source ID that is the node ID of the serial bus experimental apparatus and a data length of an asynchronous packet and data including an activation instruction. Further, the controller $3_n$ instructs the error creation position set up circuit 49 in the transfer error creation circuit 40 to set the 13th and 14th bytes to the error creation positions.

The link layer circuit $5_n$ produces an asynchronous packet (see FIG. 8) conforming to a predetermined format adding a correct header CRC and data CRC obtained by calculation and the like. At the same time, the link layer circuit $5_n$ notices transmission request and the transfer speed to the physical layer circuit $4_n$ through the control line LReq. When the physical layer circuit $4_n$ wins arbitration of access to the high performance serial bus and provides transfer permission for the link layer circuit $5_n$ through the control lines CTL0, CTL1, the link layer circuit $5_n$ outputs the transmission data in groups of 2 bits from the first of the asynchronous packet in synchronization with the clock SCLK through data lines Do and $D_1$ (at this moment, the link layer circuit $5_n$ outputs a control signal through the control lines CTL0, CTL1 to indicate that the transmission data is being output) (see FIG. 10).

While the link layer circuit $5_n$ outputs a control signal through the control lines CTL0, CTL1 to indicate that the transmission data is being output, the transfer direction identification circuit 41 outputs an L level. Therefore, as the buffer circuit 42 outputs an L level, the buffer circuits both 44 and 45 become non-active, and, as the buffer circuit 43 outputs an H level, the buffer circuits both 46 and 48 become active.

On the other hand, the byte position detection circuit 50 receives the transfer speed =100 Mbps. When the control signal outputted from the link layer circuit $5_n$ through the control lines CTL0 and CTL1 indicates that the link layer circuit $5_n$ starts outputting transmission data of one certain packet for the physical layer circuit $4_n$ the byte position detection circuit 50 outputs a byte position 1. Thereafter, the input count of the clock SCLK is counted and the count value is represented as k. Each time k becomes a multiple of 4, the byte position is incremented by +1 and then outputted (see FIG. 10).

When the link layer circuit $5_n$ starts outputting a control signal through the control lines CTL0, CTL1 to indicate that transmission data is being output, the link layer circuit $5_n$ outputs the first 2 bits of the transmission packet to $D_0$ and $D_1$. Thereafter, the link layer circuit $5_n$ outputs the transmission data in groups of 2 bits in synchronization with the clock SCLK. In the ranges from the first byte to the 12th byte and from the 15th byte to the last byte of the transmission packet, a match is not found between the byte position detected by the byte position detection circuit 30 and the error creation position set by the error creation position set up circuit 49. Therefore, the data change indication circuit 51 outputs an H level. Thus, the output of $D_0$ from the link layer circuit $5_n$ is inputted to the physical layer circuit $4_n$ through the buffer circuit 46, EX-NOR circuit 47 and buffer circuit 48 as it is. Of course, the output of $D_1$ from link layer circuit $5_n$ is inputted to the physical layer circuit $4_n$ as it is.

At the 13th and 14th bytes of the transmission packet, the byte position detected by the byte position detection circuit 50 and the error creation position set by the error creation position set up circuit 49 coincide, and the data change indication circuit 51 outputs an L level. Therefore, the output of $D_0$ from the link layer circuit $5_n$ is inverted by the EX-NOR circuit 47 and then inputted to the physical layer circuit $4_n$. (The output of $D_1$ from the link layer circuit $5_n$ is inputted the physical layer circuit $4_n$ as it is.) As a result, the physical layer circuit $4_n$ outputs the transmission packet including an error in the value of the data length through the high performance serial bus 1.

When the link layer circuit $5_n$ completes the outputting of a packet of transmission data and has no packet to transmit, the link layer circuit $5_n$ outputs a control signal to indicate the completion of transmission through the control line CTL0, CTL1. Receiving the signal, the physical layer circuit $4_n$ shifts to other processing.

By transmitting a packet including an error to the node instrument $2_1$, it is allowed to check whether the node instrument $2_1$ can decode and correctly process the error packet or not. If the node instrument $2_1$ returns back a transmission signal of an isochronous packet at a transfer speed of 100 Mbps in a fixed cycle, the physical layer circuit $4_n$ receives and converts the signal to reception data and output the reception data to the link layer circuit $5_n$. At this moment, as the physical layer circuits $4_2$–$4_n$ output a control signal to indicate that the reception data is being outputted through the control lines CTL0, CTL1, the transfer direction identification circuit 21 in the transmission error creation circuit 40 outputs an H level. Therefore, the buffer circuits 46 and 48 become non-active, and the buffer circuits 44 and 45 become active, and so the reception data outputted from the physical layer circuit $4_n$ is inputted to the link layer circuit $5_n$ as it is.

When the control signal to indicate that the reception data is being outputted is on the control lines CTL0, CTL1, the link layer circuits $5_2$–$5_n$ receive the reception data in synchronization with the clock SCLK and decode the reception packet performing error detection/ correction by using a header CRC and data CRC. Further, as the reception packet is an isochrnous packet, the link layer circuits $5_2$–$5_n$ check whether the channel number included in the header is the number whose reception is directed by the high order controllers and, if it is the number directed, output the reception packet to the high order controllers. If it is not the number directed, this packet is ignored. Concerning the serial bus experimental apparatus $2_n$, it is assumed that the reception of the number has been directed in advance by the controller $3_n$. Therefore, the link layer circuit $5_n$ outputs the reception packet from the node instrument $2_1$ to the controller $3_n$, and the controller $3_n$ enforces the reception packet to be stored in the memory 10. Each time an isochronous packet from the node instrument $2_1$ is repeatedly received, the same processing is repeated.

When display is directed through the operational panel 12, the controller $3_n$ allows the display of the reception packet stored in the memory 10 on the display 11 and allows an inspector to check it.

According to this embodiment, when the link layer circuit $5_n$ produces and outputs a transmission packet destined for other node instrument, the transmission error creation circuit 40 changes a portion of the packet to different data and inputs the different data to the physical layer circuit $4_n$, at the same time. Therefore, without use of a particular link layer circuit, such a simple configuration allows the transmission of a packet including an error to a node instrument to be tested and also allows an operating test in the case reception of an error packet.

Further, for each transmission data of a transmission packet outputted from the link layer circuit $5_n$, the position of each data within the transmission packet is detected by the byte position detection circuit 50. When the data position does not match with an error creation position set by the error creation position set up circuit 49, the transmission data outputted from the link layer circuit $5_n$ is inputted to the physical layer circuit $4_n$ as it is. When the position detected by the byte position detection circuit 50 matches with the error creation position set by the error creation position set up circuit 49, the transmission data outputted from the link layer circuit $5_n$ is replaced with different data, and the different data is inputted to the physical layer circuit $4_n$. Therefore, by changing an error creation position by the error creation position set up circuit 49, it is allowed to create an error at any desired position in a packet, and so a wide spectrum of tests is allowed.

In accordance with a first aspect of the invention, a series of packets transmitted over a serial bus including a packet transmitted from a serial bus experimental apparatus can be captured into a memory means through a separate path from the path for a controller for a test on the serial bus. Without need for a controller of high-speed processing, the transmission of a desired packet for other node instrument can be achieved in parallel with the capture of massive packets transmitted over the serial bus.

In accordance with a second aspect of the invention, when the link layer circuit produces and outputs a transmission packet for other node instrument, the data of a predetermined position of the transmission packet can be replaced with different data and the different data is outputted to the physical layer circuit, at the same time. Therefore, the transmission of a packet including an error and operational test at the reception of an error packet can be achieved by a simple configuration without a particular link layer circuit.

What is claimed is:

1. A serial bus experimental apparatus including a physical layer connected to a serial bus, receiving a transmission signal from other node instrument on said serial bus and outputting reception data, and converting transmission data to a transmission signal and sending the transmission signal over said serial bus, and a link layer receiving the reception data from said physical layer and taking out a reception packet therefrom, producing a transmission packet destined for other node instrument, converting the transmission packet to transmission data and transferring the transmission data to said physical layer comprising:

a processing circuit being interposed between said physical layer and said link layer and capturing both or either of the reception data from said physical layer and the transmission data from said link layer and performing predetermined processing thereon, and capturing and storing a series of packets transmitted over said serial bus, and/or creating an artificial error.

2. A serial bus experimental apparatus including a physical layer circuit connected to a serial bus, receiving a transmission signal transmitted over the serial bus from other node instrument, converting the transmission signal to reception data and outputting the reception data, converting transmission data to a transmission signal and transmitting the transmission signal over said serial bus, and a link layer circuit connected to said physical layer circuit, according to an instruction from a controller for a test on said serial bus, producing a transmission packet destined for other node instrument and outputting transmission data making up the transmission packet to said physical layer circuit, comprising:

a memory means for allowing said controller for a test on said serial bus to read out the contents of said memory means and to perform predetermined processing thereon, a packet capture means connected to data output sides of said physical layer circuit and said link layer circuit, receiving reception data and transmission data outputted from said physical layer circuit and said link layer circuit, and enforcing a series of packets received and transmitted between said physical layer circuit and said link layer circuit to be stored in said memory means.

3. The serial bus experimental apparatus of claim 2, and further comprising;

a reference packet set up means for setting a packet of reference for capture, wherein said packet capture means enforces packets in a specified time relationship with the reference packet set by said set up means to be stored in said memory means.

4. The serial bus experimental apparatus of claim 2, wherein said packet capture means enforces timing information of the packets to be stored together.

5. A serial bus experimental apparatus including a physical layer circuit connected to a serial bus, receiving a transmission signal transmitted over said serial bus from other node instrument, converting the transmission signal to reception data, converting transmission data to a transmission signal and transmitting the transmission signal over said serial bus, and a link layer circuit connected to said physical layer circuit, according to an instruction from a controller for a test on said serial bus, producing a transmission packet destined for other node instrument and outputting transmission data making up the transmission packet to said physical layer circuit, wherein said physical layer circuit and said link layer circuit receive and transmit control signal data through a control line and receive and transmit data by handshaking, and comprising:

a memory means for allowing said controller for a test on said serial bus to read out the contents of said memory means and to perform predetermined processing thereon, a packet capture means connected to data output sides and to control signal output sides of said physical layer circuit and said link layer circuit, receiving reception data and control signal data outputted from said physical layer circuit and transmission data and control signal data outputted from said link layer circuit, and enforcing a series of packets received and transmitted between said physical layer circuit and said link layer circuit to be stored associated with said control signal data in time relationship in said memory means.

6. The serial bus experimental apparatus of claim 5, and further comprising, a reference packet set up means for setting a packet of reference for capture, wherein said packet capture means enforces a series of packets in a specified time relationship with the reference packet set by said reference packet set up means to be stored associated with said control signal data in time relationship in said memory means.

7. The serial bus experimental apparatus of claim 5, wherein said packet capture means enforces timing information of the packets to be stored together.

8. A serial bus experimental apparatus including a physical layer circuit connected to a serial bus, receiving a transmission signal transmitted over the serial bus from other node instrument, converting the transmission signal to reception data, and converting transmission data to a transmission signal and transmitting the transmission signal over said serial bus, and a link layer circuit connected to said physical layer circuit, according to an instruction from a controller for a test on said serial bus, producing a transmission packet destined for other node instrument, outputting a transmission data stream making up a transmission packet to said physical layer circuit, receiving reception data stream from said physical layer circuit, taking out therefrom a predetermined packet and outputting the packet to said controller for a test on said serial bus, comprising, a transmission error creation circuit provided between said physical layer circuit and said link layer circuit and, when said link layer circuit produces the transmission packet destined for other node instrument and outputs the packet, while converting a portion of the transmission data stream making up the transmission packet to different data, inputting the different data to said physical layer circuit.

9. The serial bus experimental apparatus of claim 8, wherein said transmission error creation circuit comprises:

a error creation position set up means for setting an error creation position in said transmission packet, a position detection means for detecting a position of data within the transmission packet for each transmission data of the transmission packet outputted from said link layer circuit, a data change means for inputting the transmission data outputted from said link layer circuit to said physical layer circuit as it is when the position detected by said position detection means does not match with an error creation position set by said error creation position set up means, and replacing said transmission data outputted from said link layer circuit with different data and inputting said different data to said physical layer circuit when the position detected by said position detection means matches with said error creation position set by said error creation position set up means.

* * * * *